United States Patent [19]

Willis et al.

[11] Patent Number: 4,842,094

[45] Date of Patent: Jun. 27, 1989

[54] ROTATABLE HORIZONTAL VIBRATOR

[75] Inventors: Howard A. Willis, Tulsa; Marvin G. Bays, Ponca City, both of Okla.; Jose P. Munoz, Joplin, Mo.

[73] Assignee: Amoco Corporation, Chicago, Ill.

[21] Appl. No.: 122,574

[22] Filed: Nov. 16, 1987

Related U.S. Application Data

[63] Continuation of Ser. No. 834,701, Feb. 28, 1986, abandoned.

[51] Int. Cl.$^4$ .............................................. G01V 1/00
[52] U.S. Cl. .................................... 181/114; 367/189
[58] Field of Search ............... 181/108, 113, 114, 119, 181/120, 121; 367/75, 143, 189, 190; 73/662-672

[56] References Cited

U.S. PATENT DOCUMENTS

| | | | |
|---|---|---|---|
| 3,286,783 | 11/1966 | Cherry, Jr. et al. | 181/114 |
| 3,866,709 | 2/1975 | Mifsud | 181/114 |
| 4,244,437 | 1/1981 | Fulkerson | 181/114 |
| 4,291,780 | 9/1981 | Fulkerson | 181/114 X |
| 4,321,981 | 3/1982 | Waters | 181/119 |
| 4,564,083 | 1/1986 | Layotte et al. | 181/114 |
| 4,609,066 | 9/1986 | Layotte et al. | 181/114 X |

FOREIGN PATENT DOCUMENTS 2530344  1/1984  France ............................... 181/114

Primary Examiner—Brian S. Steinberger
Attorney, Agent, or Firm—S. H. Brown; F. E. Hook

[57] ABSTRACT

Disclosed is an apparatus for imparting only shear wave energy into the earth comprising a vibrating pad for connection to a mobile support, such as a wheeled vehicle, and means for vibrating the pad to impart at least two polarizations of shear wave energy into the earth. One such means includes azimuthally rotating the pad and/or the vibration energy generator.

3 Claims, 3 Drawing Sheets

ROTATABLE HORIZONTAL VIBRATOR

This is a continuation of copending application Ser. No. 834,701 filed on Feb. 28, 1986 now abandoned.

BACKGROUND OF THE INVENTION

1. Field of the Invention

The present invention relates to a horizontal vibrator assembly and, more particularly, to such a vibrator assembly capable of imparting at least two polarizations of shear wave energy into the earth.

2. Setting of the Invention

In one method of exploring for oil and gas, energy is imparted into the earth and the reflected energy is recorded, processed, and interpreted. Various methods have been used to impart the energy into the earth, including placing a vibrating pad into engagement with the earth's surface, such as a method called "Vibroseis" developed by Continental Oil Company. The Vibroseis-type generator usually comprises a wheeled vehicle, such as a truck, and a hydraulic piston assembly to vibrate the pad vertically to impart compressional (P)wave energy or horizontally to impart a single direction of shear x (S)wave energy.

Geophysicists skilled in the use of shear wave exploration techniques frequently desire to acquire shear waves in at least two polarizations, i.e., in at least two azimuthal directions. Most shear wave generators vibrate the earth's surface at an angle of 90° to the centerline of the wheeled vehicle, and if a different azimuthal angle or polarization of energy is desired the whole vehicle must be repositioned. This repositioning of the vehicle is not only time consuming and expensive, but problems are encountered in positioning the vibrating pad exactly in the same spot as before. If the pad is not positioned exactly the same, errors can be introduced into the recorded signals.

There is a need for a horizontal vibrator assembly that pivots or rotates to impart at least two polarizations of energy. The only known energy vibrator assembly that can produce some shear wave energy in at least two directions is a compressional vibratory assembly described in U.S. Pat. No. 3,866,709, wherein a gyrating hammer generator is used to impart essentially only compressional wave energy in at least two axes as the hammer gyrates. The inventors hereof know of no apparatus for imparting essentially only shear wave energy into the earth in at least two polarizations.

SUMMARY OF THE INVENTION

The present invention has been developed to overcome the foregoing deficiencies and meet the above described needs. Specifically, the present invention comprises an apparatus for imparting essentially only shear wave energy into the earth. The apparatus includes a vibrating pad adapted for connection to a mobile support, such as a truck, trailer, skid or the like. Means are provided for vibrating the pad to impart at least two polarizations of shear wave energy into the earth. Means can be included for raising and lowering the vibrating pad into engagement with the earth's surface. Further, means can be included to azimuthally rotate the pad and/or the means for generating the vibration energy so that at least two polarizations of shear wave energy can be imparted into the earth.

By using the present invention, the vehicle need not be moved, when more than one angle or polarization of shear wave energy is to imparted. The pad and/or the energy vibrator is rotated in any desired direction and then lowered into engagement with the earth's surface. Therefore, time is saved, money is saved, and no misplacement data errors will develop.

DETAILED DESCRIPTION OF THE PREFERRED EMBODIMENTS

The present invention is an apparatus for imparting essentially only shear wave energy into the earth for use in seismic exploration, as is well known to those skilled in the art. Further, the present invention is an improvement in a swept-frequency seismic energy generator commonly referred to as Vibroseis, developed by Continental Oil Company (CONOCO). Specifically, the present invention comprises a vibratory plate or pad adapted for engagement with the earth's surface, and means for vibrating the pad to impart at least two polarizations of shear wave energy into the earth.

Figure 1:
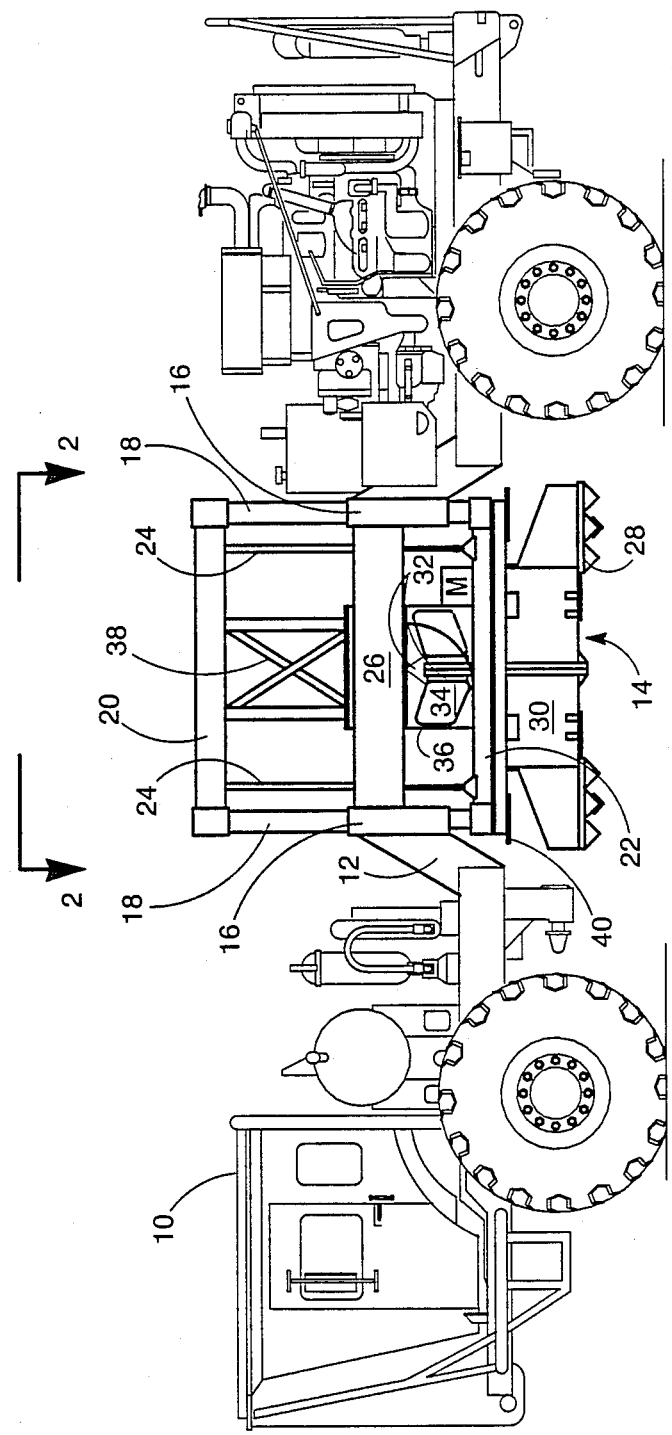
FIG. 1 is a left side elevational view of a wheeled vehicle having mounted thereto a shear wave energy vibrator assembly, embodying features of the present invention.

A better understanding of the present invention can be had by viewing the accompanying drawings. In FIG. 1, the apparatus of the present invention is either permanently or removably connected to a mobile support, which in this case is a wheeled vehicle 10. The type of mobile support utilized with the present invention can be a truck, trailer, skid pad or the like. The mobile support utilized includes a frame 12 to which is removably attached, as is shown in the industry, a seismic energy generator 14, and preferably a swept frequency seismic energy generator.

The seismic energy generator 14 comprises a hydraulic, pneumatic, or mechanically driven mass which is raised and lowered to generate compressional (P) seismic energy or shifted from front-to-back or side-to-side to generate shear (S) seismic energy, as all is well known in the industry. While the apparatus of the present invention can be used to generate compressional wave energy, for the purposes of the present discussion, the apparatus will be described for use in generating essentially only shear wave energy.

The frame 12, which is in the form of a horizontally disposed box, includes vertical guide sleeves 16 at each corner through which are reciprocally disposed vertical guide posts 18. The upper portions of each of the guide posts 18 are connected to an upper guide frame 20 to maintain the spaced relationship of the guide posts 18. The lower portions of each of the guide posts 18 are connected to a lower guide frame 22. The lower guide frame 22 is raised or lowered by mechanical devices, such as cables or ratchet mechanisms, piston and cylinder assemblies, pneumatically or hydraulically driven, or combinations of these. For the purposes of this discussion, the lower guide frame 22 is raised and lowered by at least one, and preferably two or more, hydraulic piston and cylinder assemblies 24 connected between the upper portion of the lower guide frame 22 and either a horizontal portion 26 of the frame 12 or the upper guide frame 20.

Figure 2:
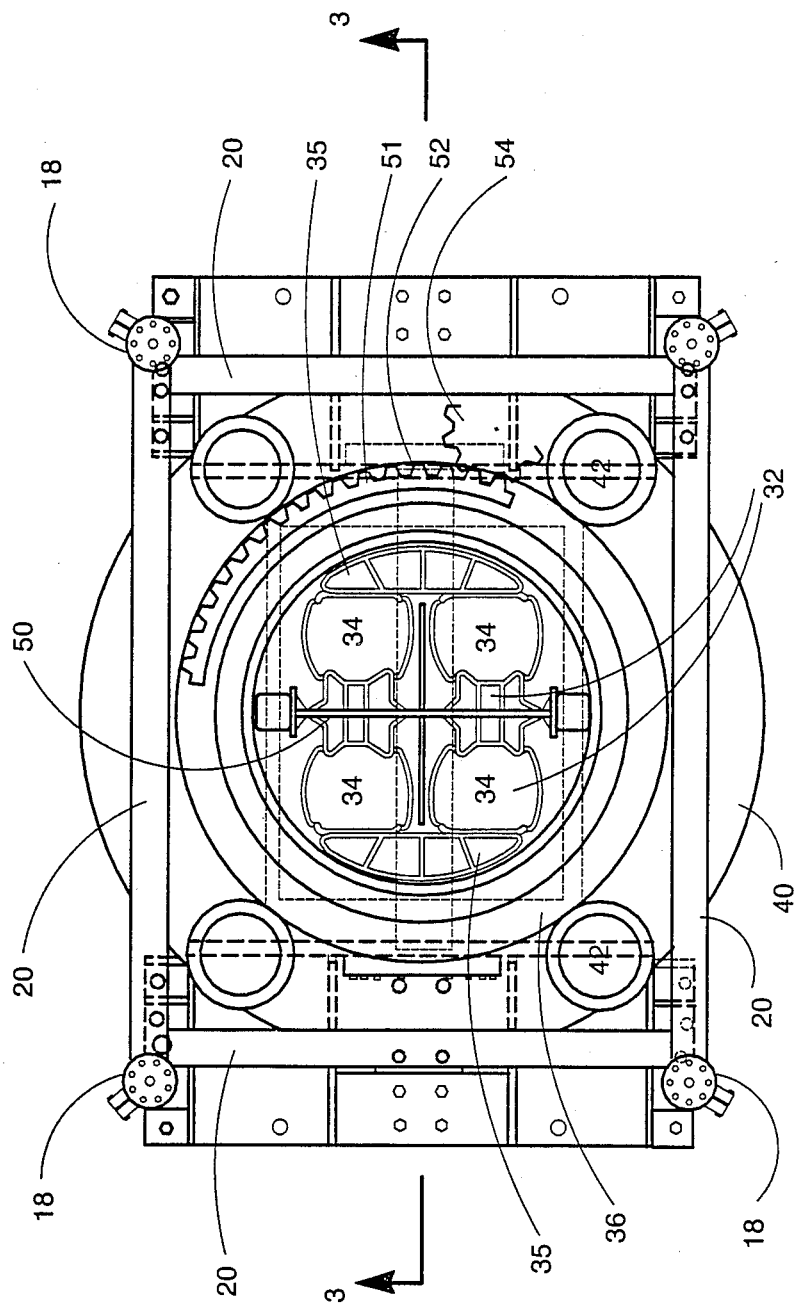
FIG. 2 is a plan view of one embodiment of the present invention taken along line 2—2 of FIG. 1.
Figure 3:
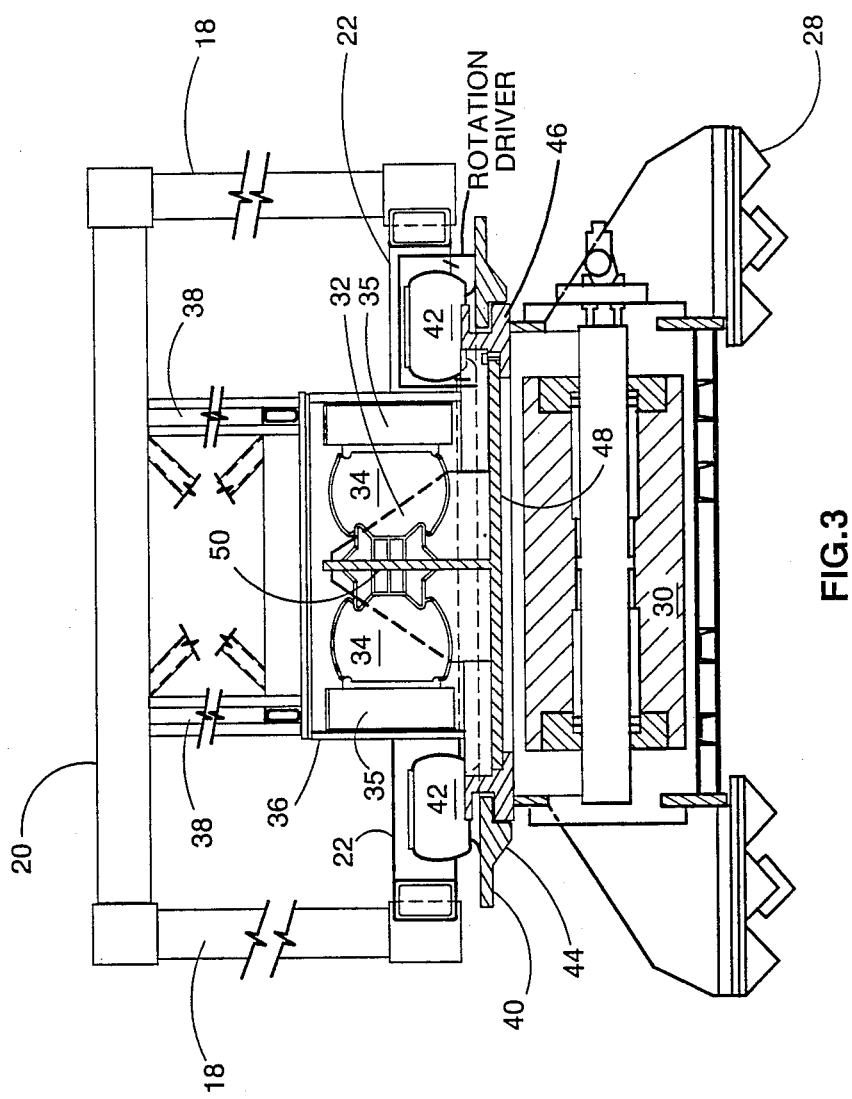
FIG. 3 is cross-section elevational view of one embodiment of the present invention taken along line 3—3 of FIG. 2.

In order to generate at least two polarizations of seismic wave energy, i.e., to be able to azimuthally rotate the direction of vibration in accordance with the present invention, one of at least two embodiments can be used. First, the device that actually engages the earth's surface can be azimuthally rotated along with the device that actually generates or creates the vibratory motion. Secondly, the device that actually generates the vibratory motion azimuthally rotates while the device that engages the earth's surface remains fixed. For the purposes of the present discussion, the first embodiment is preferred because, if needed, a shear wave generator can be more easily replaced for maintenance or a compression wave generator be used if both devices are mounted as a single unit. Specifically, a conventional shear energy vibrating pad 28 which includes the necessary shear wave generating devices 30 are mounted to the lower guide frame 22 in a novel manner. The shear energy vibrating pad 28 and generating devices 30 can be any commercially available unit and only minor attachment modifications, readily understood by those in the industry, are needed for the use with the present invention. As shown in FIGS. 2 and 3, the commercially available generating device 30 includes an upper gabled mount 32 which is partially vibrationally isolated or dampened by a plurality of resilient material members or bags 34. The bags 34 are mounted to annular submounts 35 adapted for rotary motion within a circular frame 36 rigidly mounted at a lower end within the lower guide frame 22 and at an upper end to a latticed frame 38, in turn reciprocally mounted to attachments (not shown) in the upper guide frame 20.

In order to provide the capability of azimuthally rotating the pad 28 and the generating device 30, an annular rim 40 is mounted to a lower portion of the lower guide frame 22 preferably by a plurality of resilient material shock absorbers 42, as is well known to those in the industry. The annular rim 40 includes a tangentially disposed annular upstart 44 described later. The upper portion of the generating device 30 has mounted thereto an annular channeled rim 46 of a lesser outside diameter than the annular rim 40. As can be seen in FIG. 3, the inside edge of the annular rim 40 is received into an exteriorly facing channel of the rim 46 and the upstart 44 can ride against the exterior surface of the rim 46. For ease of assembly and removal either of the rims 40 or 46 can be made from multiple components or pieces so that the channeled rim 46 can be released from containment by the annular rim 40. The annular rim 40 also is connected to or can be formed as one piece with an inner horizontal plate 48 which includes a centrally located vertical plate 50 which extends upwards into the circular frame 36 and to which is mounted the dampening bags 34.

The pad 28 and the generating device 30 are caused to rotate less than 180° and usually only 90° by any suitable rotation device. Such devices can be mechanically actuated by cables and drum, gears, ratcheting mechanisms, hydraulic or pneumatic piston and cylinder assemblies, or combinations of these generally depicted in FIG. 1 as a rotation driver M and labeled as such in FIG. 3. For the purposes of the present discussion as shown in FIG. 2, a geared rotation mechanism will be described. A horizontally disposed annular member 51 is mounted to the upper portion of the channeled rim 46 or formed as a part thereof. The annular member 51 can extend 180° around the rim 46 but is shown as extending only 90° around the rim 46. Further, the annular member 51 includes outwardly facing grooves or teeth 52 for cooperable driving engagement with a drive gear 54, which is driven by a suitable drive source (not shown) and controlled by the operator.

Now that the apparatus of the present invention has been described, a discussion of the operation of the present invention will be provided. The wheeled vehicle 10 is driven or moved to the desired location with the pad 28 and generating device 30 in an elevated position for travel. Once in place, the hydraulic piston and cylinder assemblies 24 are extended to bring the pad 28 into engagement with the earth's surface and also lift or raise the wheeled vehicle 10 off of the ground. The generating device 30 is activated, as is known to those in the industry, for example, side-to-side, to impart shear wave energy into the earth that has a polarization of 90° from the centerline of the wheeled vehicle 10. If a second or additional polarizations of shear wave energy are desired, the hydraulic piston and cylinder assemblies 24 are retracted to release the pad 28 from engagement with the earth's surface. The drive gear 54 is rotated, by any known means, to thereby force the channeled rim 46, and thereby the pad 28 and the generating device 30, to be rotated. Once the pad 28 and the generating device 30 have been rotated the desired amount, the hydraulic piston and cylinder assemblies 24 are extended to repeat the impartation process. Obviously, as many different polarizations of shear wave energy can be obtained at the same location as is desired.

As described above, the present invention provides an apparatus that is simple in design, rugged in construction, and that can use commercially available pads 28 and generating devices 30 (without substantial modification) to obtain more than one polarization of shear wave energy. Therefore, the wheeled vehicle 10 does not have to be moved wasting time and money, and the exact same location is used thereby eliminating data errors that can be induced by not vibrating in the exact same location.

Whereas the present invention has been described in particular relation to the drawings attached hereto, other modifications apart from those shown or suggested herein may be made within the scope and spirit of the present invention.

What is claimed is:

1. An improved seismic energy source mountable with a vehicle for imparting a plurality of shearwave energy polarizations between 0° to 360° into the earth at the same location without repositioning the vehicle, comprising:

(a) a vibratory pad adapted for contact with the earth;
(b) vibratory means mounted with the vibratory pad adapted to impart a linear vibratory motion to the vibratory pad whereby swept frequency shearwave seismic energy of a selected polarization can be imparted into the earth;
(c) means with the vehicle for raising and lowering the vibratory pad into contact with the earth; and
(d) means with the vehicle for horizontally rotating the vibratory pad and vibratory means to a plurality of individual azimuthal radial orientations between 0° to 360°, whereby when the vibratory pad is in contact with the earth, swept frequency shearwave seismic energy can be imparted in any of a plurality of polarizations between 0° to 360° thereby reducing data acquisition time and eliminating vibratory pad misplacement induced data errors.

2. The seismic energy source of claim 1 wherein the means for raising and lowering the vibratory pad comprises a plurality of guideposts connected to the vibratory pad and received by the vehicle, and at least one hydraulic piston and cylinder assembly connected between the vibratory pad and the vehicle.

3. The seismic energy source of claim 1 wherein the means for horizontally rotating the vibratory pad and vibratory means is selected from the group consisting of gear drive, ratchet drive, cable drive, hydraulic piston and cylinder assembly, pneumatic piston and cylinder assembly, and combinations thereof.

* * * * *